(12) United States Patent
Knoll et al.

(10) Patent No.: US 9,507,842 B2
(45) Date of Patent: Nov. 29, 2016

(54) SYSTEM FOR REPLICATION-DRIVEN REPOSITORY CACHE INVALIDATION ACROSS MULTIPLE DATA CENTERS

(71) Applicant: Oracle International Corporation, Redwood Shores, CA (US)

(72) Inventors: Phillip O. Knoll, Chicago, IL (US); Zhenyu Zhu, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 455 days.

(21) Appl. No.: 13/862,394

(22) Filed: Apr. 13, 2013

(65) Prior Publication Data
US 2014/0310293 A1    Oct. 16, 2014

(51) Int. Cl.
*G06F 17/30* (2006.01)

(52) U.S. Cl.
CPC ..... *G06F 17/30575* (2013.01); *G06F 17/3048* (2013.01)

(58) Field of Classification Search
CPC ............ F06F 8/20; G06F 8/355; G06F 8/34
See application file for complete search history.

(56) References Cited

U.S. PATENT DOCUMENTS

| | | | |
|---|---|---|---|
| 2004/0153576 A1* | 8/2004 | Hansmann et al. | 709/248 |
| 2007/0239791 A1* | 10/2007 | Cattell et al. | 707/200 |
| 2010/0161551 A1* | 6/2010 | Whynot | G06F 11/2094 707/610 |
| 2010/0293335 A1* | 11/2010 | Muthiah et al. | 711/133 |

OTHER PUBLICATIONS

Oracle Fusion Middleware—"Architecting Oracle ATG Web Commerce for Maximum Availability"; An Oracle White Paper; Oct. 1, 2011; 32 pages.
Oracle ATG Web Commerce—"Repository Guide"; Version 9.4; Copyright 1997 and 2011; 330 pages.
Oracle Fusion Middleware—"Real-time Access to Real-Time Information"; Aug. 2012; 32 pages.

* cited by examiner

*Primary Examiner* — Thu Nga Nguyen
(74) *Attorney, Agent, or Firm* — Trellis IP Law Group, PC (57) ABSTRACT

A distributed cache invalidation system operating on multiple data centers utilizes metadata, read from a replication stream transmitted between data centers, to identify cached items to be invalidated.

20 Claims, 7 Drawing Sheets

SYSTEM FOR REPLICATION-DRIVEN REPOSITORY CACHE INVALIDATION ACROSS MULTIPLE DATA CENTERS

BACKGROUND

Increasingly, Web Commerce applications and other distributed applications are run on application servers located at two or more data centers and are being served data from the two or more data centers. These data centers range from a few miles apart to a few thousand miles apart. The second (or nth) data center may serve as a virtual safe deposit box for realtime database backups, or on the opposite side of the spectrum, as a fully-functional data center, capable of handling all production traffic on its own.

The level to which the second (or nth) data center is used depends on the amount of acceptable downtime (Recovery Time Objective or RTO), the amount of acceptable data loss if a failure occurs (Recovery Point Objective or RPO), and finally the ability of an organization to execute (financial resources, competency, time, etc.).

Database replication programs are utilized to assure that databases at different data centers store the same copy of the application data. These programs monitor updates to a copy of the database made by an application server at one data center and transmit messages in an update stream to other data centers where the messages identify the changes made and cause the update of the database copies so that all databases maintain identical copies of the same data.

Efficient database access is important to many distributed applications. An application should be designed to require minimal access to the database and to ensure data integrity. An intelligent caching strategy is central to achieving these goals.

Distributed applications that require timely or related access to the latest data may use a distributed caching scheme where each application server of the distributed application maintains its own local cache.

The major issue to overcome in any distributed environment is updates being made to the same record at the same time from two or more distant databases. Due to latency, data replication between the databases must often be asynchronous. With asynchronous replication and no changes to configuration, the problem of data being overwritten or corrupted will always exist.

In the case of distributed caching, if one application server makes a change to a record in the database that is cached then all copies of that record that are cached by the other application servers will no longer be valid and processes relying on the invalid cached records will produce errors. The process of notifying other application servers in the same data center about changes to application data is known as distributed cache invalidation.

SUMMARY

In example embodiments, the application data stored in the database is represented to the application by means of an object relational repository. This repository allows the application to operate on data stored in the database using repository item objects in the application logic to represent the data, and changes to the repository item objects will likewise produce changes in the corresponding database tables. Changes thus made to the application data in the local data center are copied to remote data center peer(s) by means of the replication mechanism. Likewise, updates coming from the remote data center will be applied locally, and each replicated database table is assigned an additional update trigger that applies to the incoming replication update stream from remote data center peers. This trigger writes metadata about these incoming updates into a simple notification table.

A scheduled service watches this notification table for new replication metadata, and uses a reversible implementation of the repository item object mapping to match the notification information to the correct repository item-descriptor. The service then calls a distributed cache invalidation event in its own data center, dropping the item from the cache based on the repository item ID matching the primary keys in the notification entry. This service runs every 10 seconds by default and uses fast, direct SQL statements for maximum performance. Changes to the repository item object definitions will automatically be reflected in the notification matching service, and the original repository item object ID will be faithfully reconstructed from this model upon invocation. In this way it uses existing configurations to apply a known quantity to the performance of distributed cache synchronization while ensuring updates are propagated in a timely fashion.

An example embodiment is a method, performed by one or more processors at a first data center, for invalidating items using a distributed cache mode at the first data center, the method comprising a broker service reading a notifier table, maintained at the first data center, with the notifier table including metadata read from the replication data stream, indicating updates made to tables of a database at a second data center that have recently been replicated to corresponding tables of a database at the first data center, where the second data center is remote from the first data center, with the update metadata comprised of: the name of an updated first table, whether the update changed or deleted data in this table, a timestamp indicating when replication was completed for the update in the first table of the database at the first data center, and one or more name/value pairs; periodically polling this table for replication metadata to access notification items, optionally utilizing a timestamp to ascertain whether the age of the notification item is less than a maximum value, mapping a first table name stored in a first accessed notification item to one or more mapped repository item definitions that use the distributed cache mode, invoking a distributed cache invalidation system implemented at the first data center, and utilizing name/value pairs stored in the metadata to provide the identity of the one or more mapped items to be invalidated to the distributed cache invalidation system, and invoking a distributed cache invalidation mechanism over this identity in the repository to invalidate all cached copies of the mapped item at the first data center.

A further understanding of the nature and the advantages of particular embodiments disclosed herein may be realized by reference to the remaining portions of the specification and the attached drawings.

DETAILED DESCRIPTION OF EMBODIMENTS

A first example embodiment will be described by way of example, not limitation, as being implemented in an ATG Data Anywhere Architecture™, owned and distributed by the assignee of the present application, which provides a unified view of content and data across a business for organizations and their customers. The core of the ATG Data Anywhere Architecture is the Repository API. Through the Repository API, a single approach can be employed to accessing disparate data types, including SQL databases, LDAP directories, content management systems, and file systems.

Figure 1:
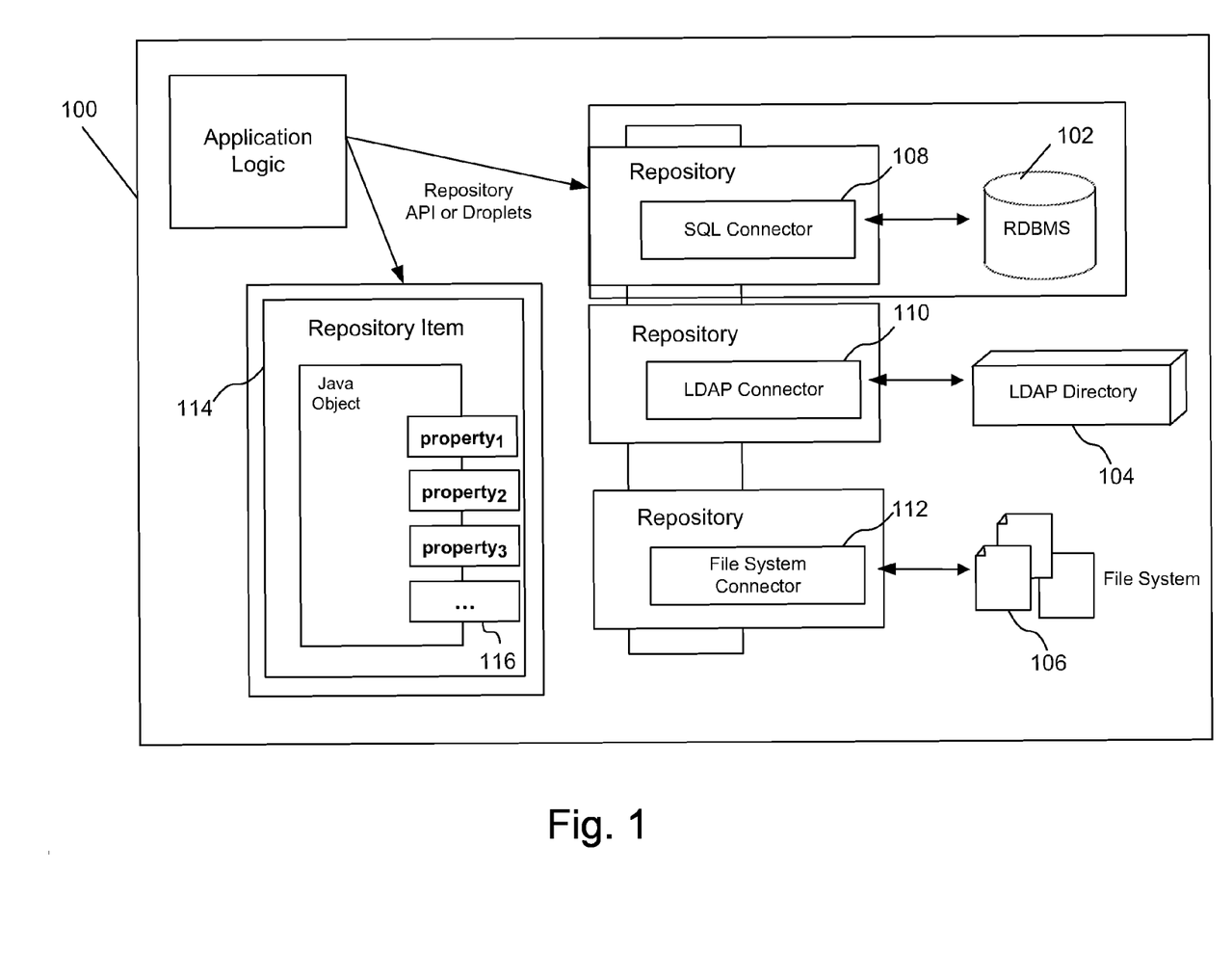
FIG. 1 is a block diagram illustrating an example repository.

FIG. 1 is a block diagram depicting a view of repository component 100 and its items. FIG. 1 depicts database sources including a relational database management system (RDBMS) 102, a Light Directory Access Protocol (LDAP) directory 104 and a file system 106. Respective connectors 108, 110, and 112 translate data from each of the database sources into a form that can be stored as a repository item 114 which, in this example, is a Java object. Each repository item is composed of named properties 116 that store the item's data.

In many cases an item corresponds to a row in a referenced database. Examples of properties for an item are id, firstName and lastName. In a Structured Query Language (SQL) repository these properties generally correspond to table columns. Repository item properties are defined in its item descriptor which defines an item type.

An item descriptor provides the following information: (1) the item type's name, (2) item type properties, (3) the class of the Java object used to represent the item type, for example, Integer or String, and (4) configuration settings which describe the rules for reading, writing, storing and deleting the item.

The item descriptor specifies the database tables and columns of the database tables that store the data of the item properties. For example, the item descriptor includes the name of a table, e.g. <table name="user">, and the name of the column that holds the primary keys, e.g., <property name="id" column-name="product_id"/>. Therefore, the item descriptor includes a mapping from the item to the database table.

Each repository item must have an identifier, which is called a repository ID. The repository ID must uniquely differentiate the repository item from all other repository items of the same type. The repository is typically configured to find the repository ID from some elements of the underlying data. In the SQL repository, for instance, each item descriptor must specify the columns that act as the repository ID, usually the same as the table's primary key.

Repository items can correspond to business objects, such as customers, and elements of business objects, such as a customer's shipping address. The item descriptor in an SQL repository defines a repository item type. It specifies repository item properties and the database tables and columns that store the data of those properties.

The combination of item descriptors, properties, identifiers, and items allows a repository to read application data from the underlying data store and write application data back to it.

Figure 2:
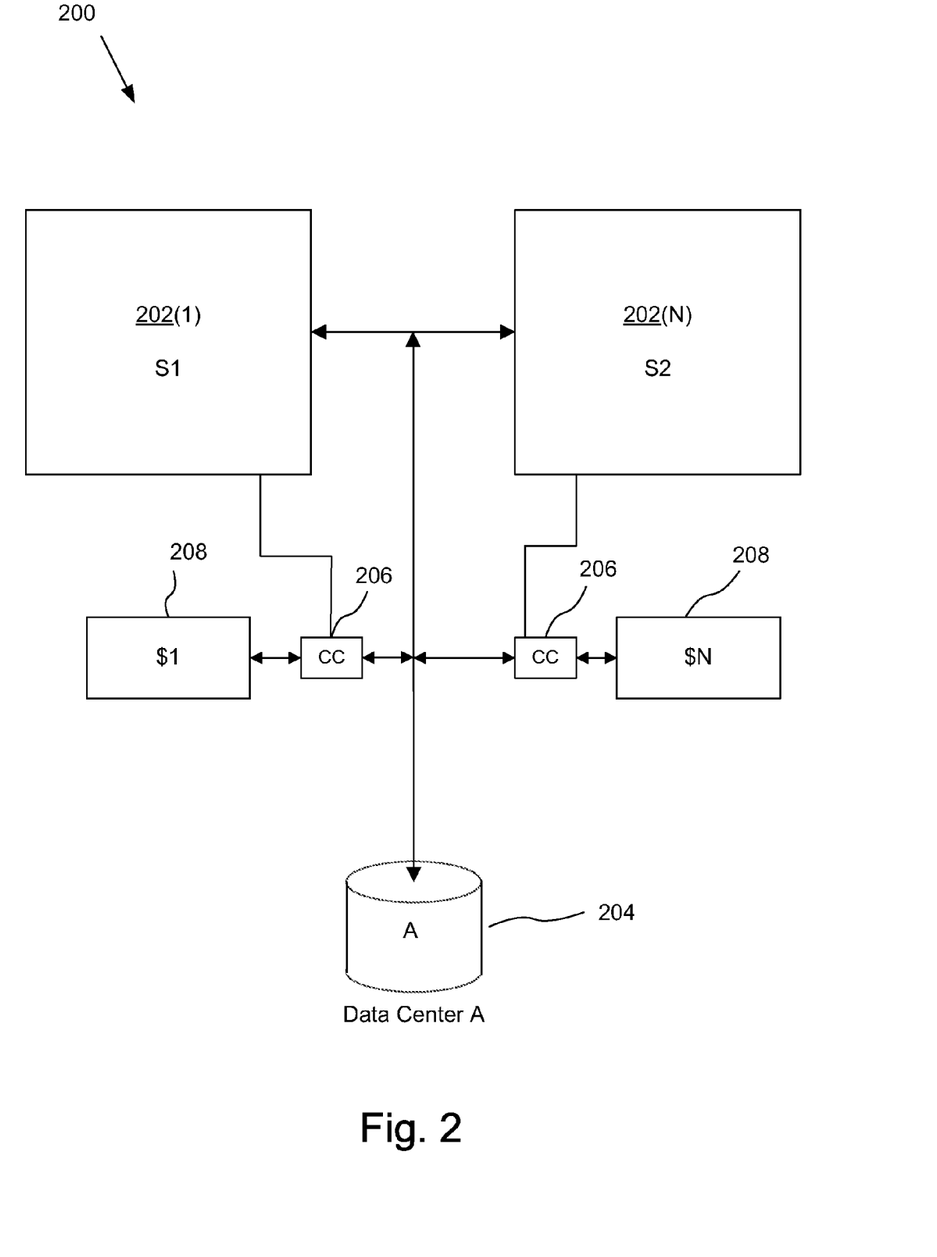
FIG. 2 is a block diagram illustrating an example distributed cache system.

FIG. 2 depicts an example of a distributed cache scheme 200. Multiple application servers 202 are running a distributed application and each application server is configured to access a first instance of a required data item from a database 204. The database is typically stored in disc drives and the access rate is slow.

The distributed caching mode is utilized if real-time access to the first data item is required, the first data item is updated infrequently and there are a modest number of caches to monitor.

For these types of data a cache controller 206 is used to store data in cache memory 208 local to the application server 202. The cache memory has a high access rate to reduce latency time in accessing the first data item. Each application server has access only to its own cache so that the contents of each cache are not necessarily the same.

For example, since the ATG application servers are implemented as Java Virtual Machines (JVMs) the security rules allow each JVM to access only its own memory. The local cache would be part of the memory space of a JVM and other JVMs would not be able to access that local cache.

If one of the application servers updates the first data item stored in the database then the copies of the first data item stored in all other cache memories is invalid. A cache invalidation system notifies the application servers that cached first data item is no longer valid and that the first data item must be read from the database. This notification can take place using Transmission Control Protocol (TCP), Java Messaging System (JMS) or other similar messaging protocols.

Figure 3:
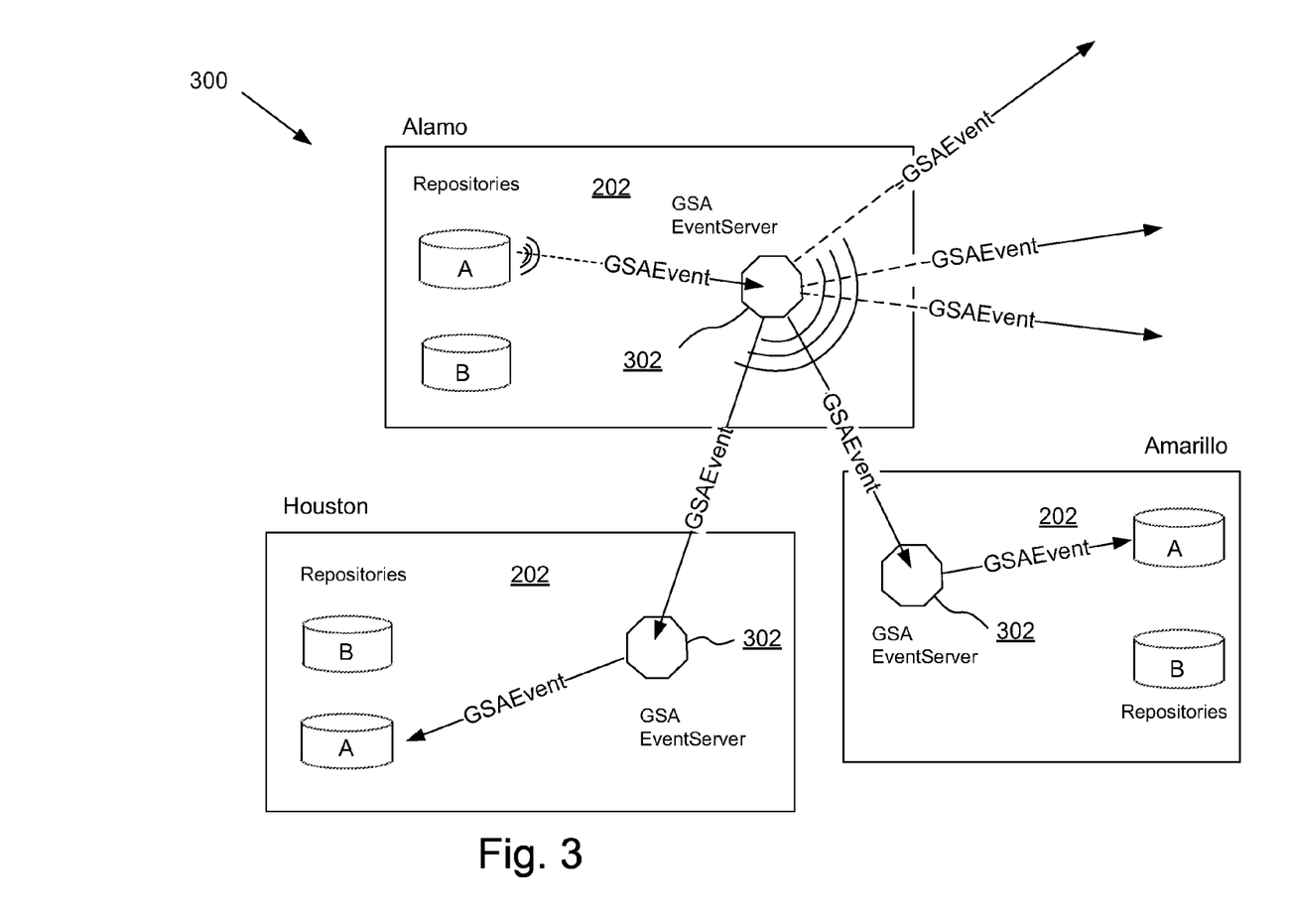
FIG. 3 is a block diagram illustrating a distributed cache invalidation system.

A description of an existing TCP distributed cache invalidation system 300 will now be described with reference to FIG. 3. FIG. 3 depicts three application servers 202 labeled Alamo, Amarillo and Houston. Each application server 202 includes a Generic SQL Adapter (GSA) Event Server component 302. The Generic SQL Adapter (GSA) Event Servers are connected to a network and the Event Servers send and receive cache invalidation events over the network between participating application servers using TCP.

In this example, when repository A of the Alamo application server invalidates the first data item in its cache it sends a GSAEvent to its Generic SQL Adapter (GSA) Event Server. All repositories in application server instance reference the same event server. When instantiated, the event server opens up an application server socket on a specified TCP port or, if unspecified, on a port that is randomly assigned.

A GSA subscriber table maintains routing information for each item descriptor that uses distributed TCP caching, including its repository path, and the address and port of that repository's event server. When a change occurs on one application server instance to an item that uses distributed TCP caching, its repository uses the GSA subscriber table to look up the same item descriptors on other ATG instances. It then generates a cache invalidation event with the routing information to the same item descriptors on other ATG instances.

Thus, the current implementation of the distributed TCP cache invalidation mechanism requires a "mesh" of TCP connections between all application servers. The logical networks between members of a cache mesh must be continuous, unimpeded, fully addressable and routable in both directions, and must also be free of firewalling, Network Address Translation (NAT), etc. Furthermore, these networks may not share any portion of their IP addressing scheme between any two application servers that will peer for TCP invalidation purposes. Finally, there are performance considerations that limit the effectiveness of distributed TCP.

FIG. 3 illustrates the "mesh" required between Generic SQL Adapter (GSA) Event Servers participating in distributed TCP invalidation. As the total number of application servers increases, the complexity of the invalidation semantics increases drastically. The TCP invalidation mechanism requires that an invalidation event be sent from every application server performing an update to every participating GSA Event Server, for every update on every item. Although current solutions use TCP invalidation in a single data center, its limitations will manifest more prominently when additional data centers are added.

The problem of scaling a GSA event server mesh is analogous to the handshake problem in mathematics, where scalability challenges become more difficult as the number of participating application servers increases. In this configuration, connections grow $O(n^2)$ relative to the number of application servers participating. For example, a mesh of 250 application server instances requires that 30,125 connections remain open and active. The TCP mechanism will naturally be sensitive to changes in network bandwidth, and latency for multiple updates from all application servers will be substantial during peak load, with increased processing delays in the application servers due to the large amount of TCP data. This sensitivity presents substantial performance issues if the default mesh design is extended across a multiple data center implementation, where at least half of these TCP connections would be across a remote network link. Finally, the impact of a single application server dropping its GSA subscription would be amplified across all data centers, incurring increased replication and invalidation traffic, and potentially increasing site disruption. This problem must be mitigated in multiple data centers in order to preserve the desirable behavior of TCP cache invalidation.

Figure 4:
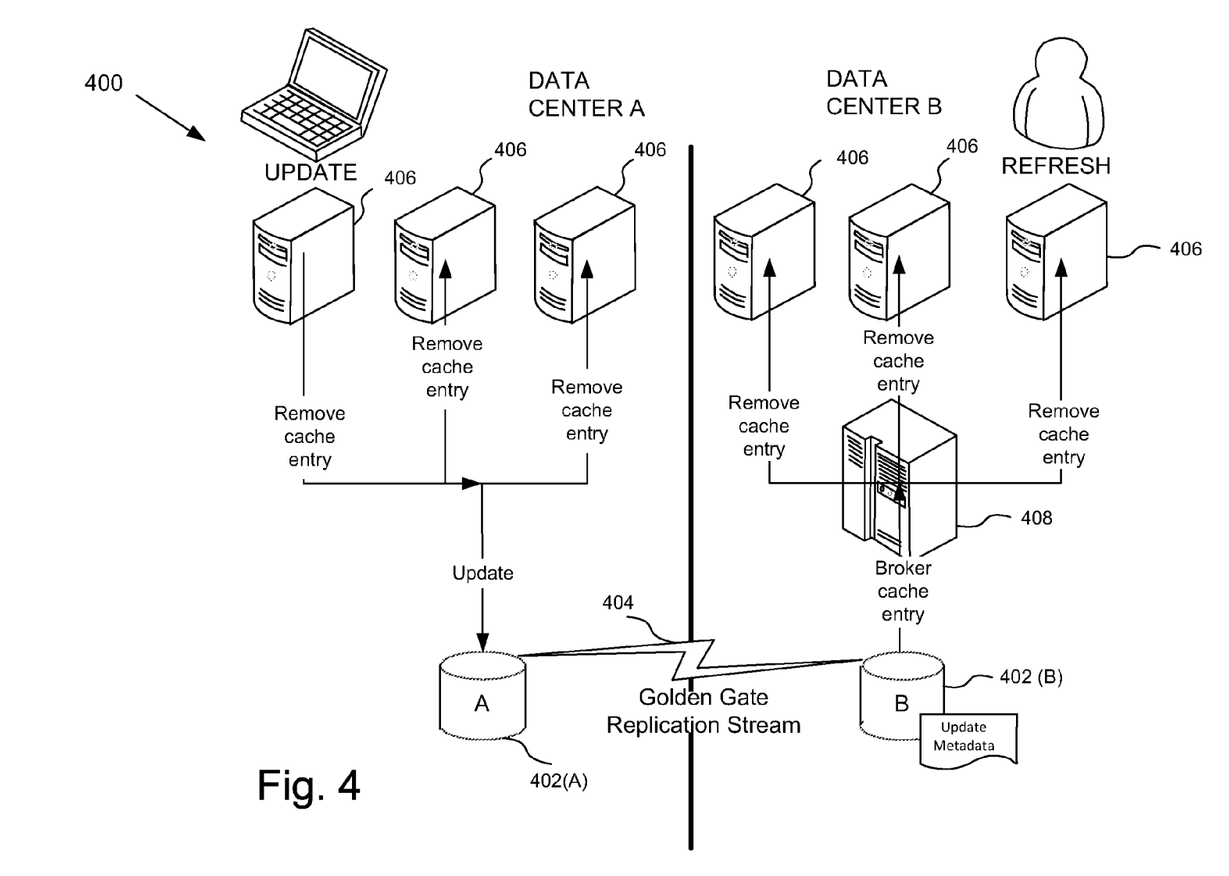
FIG. 4 is a block diagram illustrating an example embodiment of a brokered cache invalidation system.

FIG. 4 is a high-level block diagram depicting an example embodiment 400 that implements cache invalidation in a distributed application being executed on application servers running at separate data centers located at different geographical locations. Note that each application server 406 in FIG. 4 is depicted using separate hardware but, in general, multiple application servers may be running on a single hardware device.

Referring to FIG. 4, a user at Data Center A updates a transaction record in the copy of the database stored on disc drives 402(A) located at Data Center A. The updated transaction record is then replicated in the copy of the database stored on disc drives 402(B) at Data Center B so that the databases at each datacenter are mirror images of each other.

In this example, the GoldenGate data integration software, owned and distributed by the assignee of the present application, is used to replicate updates made to the database at one data center to the database at the other data center. When the update is made, GoldenGate data integration software reads the redo log of the Data Center A database and sends messages to the Data Center B database with information about the table being updated and value of the updated data. The GoldenGate replication events are exchanged using a Replication Stream 404 over a Wide Area Network (WAN) to which Data Centers A and B are connected.

In this example, Data Center A, where the update is made, uses the TCP distributed cache invalidation scheme described above to invalidate the cached copies of the updated transaction at each application server located at Data Center A. However, in the case of two data centers connected to a WAN, a straightforward implementation of the current distributed cache invalidation scheme is not feasible due to scalability constraints in the large number of peers, and due to latency constraints across the WAN link. An example of a novel extension to perform the equivalent function in the remote data center will now be described.

A brokered cache-invalidation notifier service 408 executing at Data Center B provides native cache synchronization and invalidation functionality to ensure timely updates in multiple data centers when using database replication. By keeping update notification bundled within the actual stream of updates, the brokered cache-invalidation notifier service 408 eliminates any potential timing issues and race conditions, minimizes network traffic across the WAN, and preserves the performance of the local data center's cache invalidation mechanism. Note that the notifier service 408 in FIG. 4 is illustrated as the recipient of data in this example but, in general, will have an equivalent service running in each data center.

Figure 5:
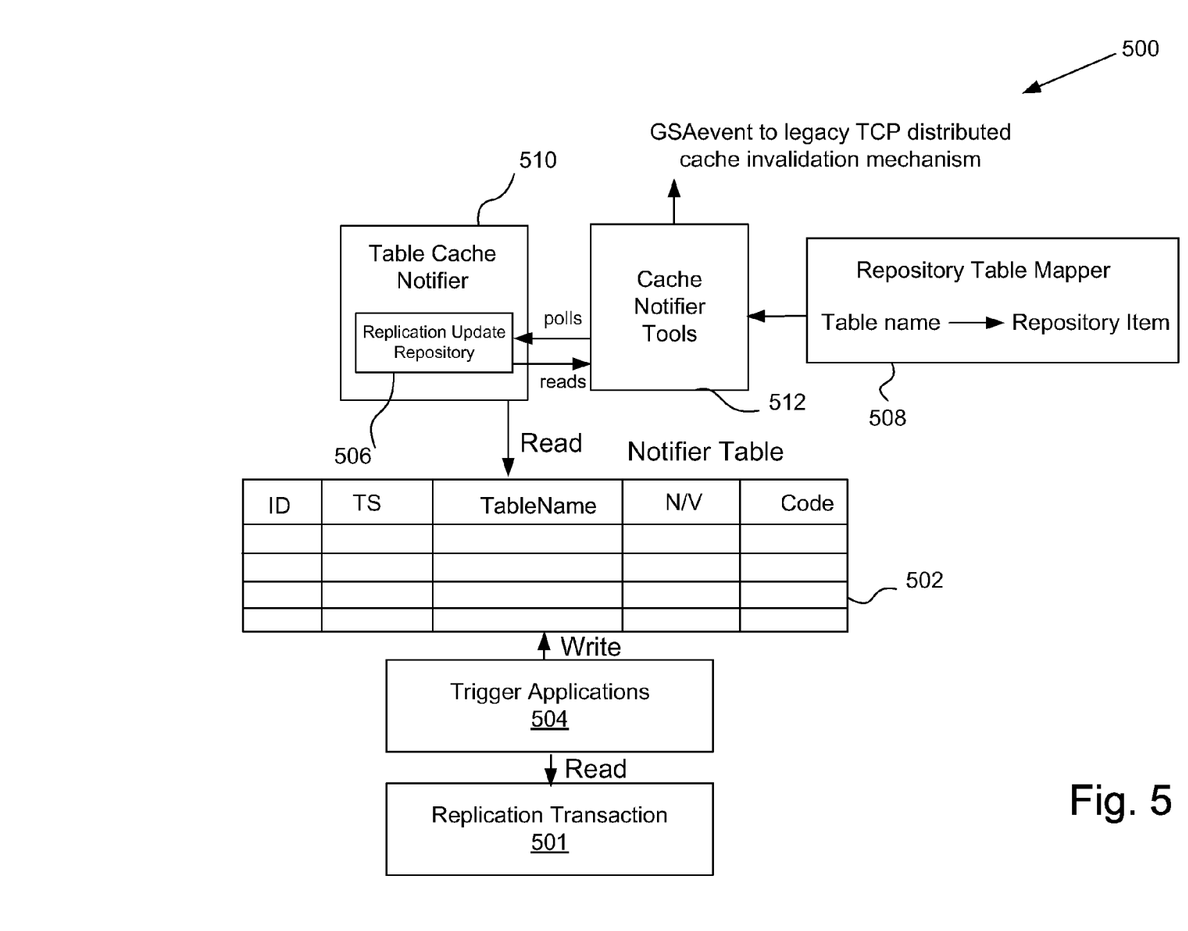
FIG. 5 is a block diagram illustrating an example embodiment of a brokered cache invalidation system.

FIG. 5 is a block diagram depicting the configuration 500 of an example brokered cache-invalidation notifier service 408. GoldenGate maintains a Notifier Table 502 at Data Center B that stores metadata about updates made to database tables at Data Center A that are to be replicated in corresponding database tables at Data Center B. Each row of the Notifier Table includes information about each update to one or more Repository items or item-type properties in Data Center A.

A Notifier Table 502 is a database table with columns for storing a unique record identifier (required by the database), a high precision timestamp (time the replicated change was committed), the name of the application database table whose contents were changed by a replication event (e.g. ATG_USER), the name and value of column(s) that uniquely identify the changed row in the application table by its primary key represented as a list of one or more name/value pairs, and a code indicating whether the changed row was updated in place or deleted.

Post-update row-level trigger applications 504 are enabled to fire on the GoldenGate Notifier Replication Transaction 501 from the Replication Stream 404 (FIG. 4) only and write the update metadata information in each row in the Notifier Table, where each row of metadata is then represented as a notification item in a Replication Update Repository 506 maintained by the brokered cache invalidation system of this example embodiment.

The properties of a notification item are id, tableName, tablePrimaryKeyIds, notificationType, and timeReceived. The id property is a database-assigned numerical ID unique to each notification. The tableName property is the name of the table whose update or deletion triggered this notification. The tablePrimaryKeyIds property is a list of name/value pairs corresponding to the primary key (possibly multi-column primary key) identifying the row updated in this write, for example, "ID=123" or "USERID=u456, ROLE=r789". The notificationType property has the value "U" for updated or "D" for deleted. The timeReceived property is the date and time when this notification was written by the trigger application.

A Repository Table Mapper Service 508 links the name and value of the column of a referenced database table to the corresponding Repository Item Descriptors that reference the name and value.

In this example embodiment, the Repository Table Mapper runs as a global service component on a GSA broker server, taking as its input a list of GSA Repository components. Upon instantiation, the Repository Table Mapper builds a lookup model of all Repository item descriptors participating in distributed cache invalidation based on their item configuration and uses this model to perform the linking operation instantly. This is accomplished by traversing the list of all indicated repositories, reading configurations of their item descriptors, and storing references to those item descriptors that are using the "distributed" cache mode along with information necessary to identify the database tables these item descriptors represent. The output is stored in a map data structure whose key is the table name for each table and whose value is a list of Repository Table Monitor Entry objects, each of which references an item descriptor that represents the table using the distributed cache mode.

The Repository Table Mapper in the novel extension thus creates a "reverse GSA map" that links database tables to their corresponding repository item descriptors. This is essentially the inverse of the mapping, described above in the description of the repository item descriptor, already maintained by the repository GSA; but built by the Repository Table Mapper constructing the same data mapping in reverse. As a result, the construction of this map is generated completely based upon updates to the ATG Repository Definitions already included in routine application releases, and requires no additional configuration. Finally, the Repository Table Mapper need only be constructed once per startup, at the first invocation of the scheduled service, its data structure can perform a constant-time name/value lookup for extremely fast resolution of Repository item descriptors.

At the end of initialization the internal data structure of the Repository Table Mapper contains a map from table names to Repository Table Monitor Entry objects, each sufficient to resolve a table name to its monitored GSA item descriptors with a constant time operation. Since it is assumed that all tables in "distributed" cache mode are already being replicated, the list of keys in the data structure will contain a subset of replicated table names. (However, it is not necessary to enable distributed caching for all replicated tables, only those which require timely updates) This lookup facility thus allows the GSA cache broker services to process table update metadata from the GoldenGate trigger applications and invalidate the correct repository item indicated by that metadata.

A Table Cache Notifier Service 510 is configured to read notification items from the Replication Update Repository 506 at specified time intervals.

Cache Notifier Tools 512 provide common functionality for Table Cache Notifier 510 using the Repository Table Mapper 508 and Generic SQL Adapter 302 utility functions to perform invalidation over various monitored repositories and item descriptors.

The operation of this example brokered cache invalidation notifier service will now be described with reference to FIGS. 4 and 5 and the flow chart 600 of FIG. 6.

Figure 6:
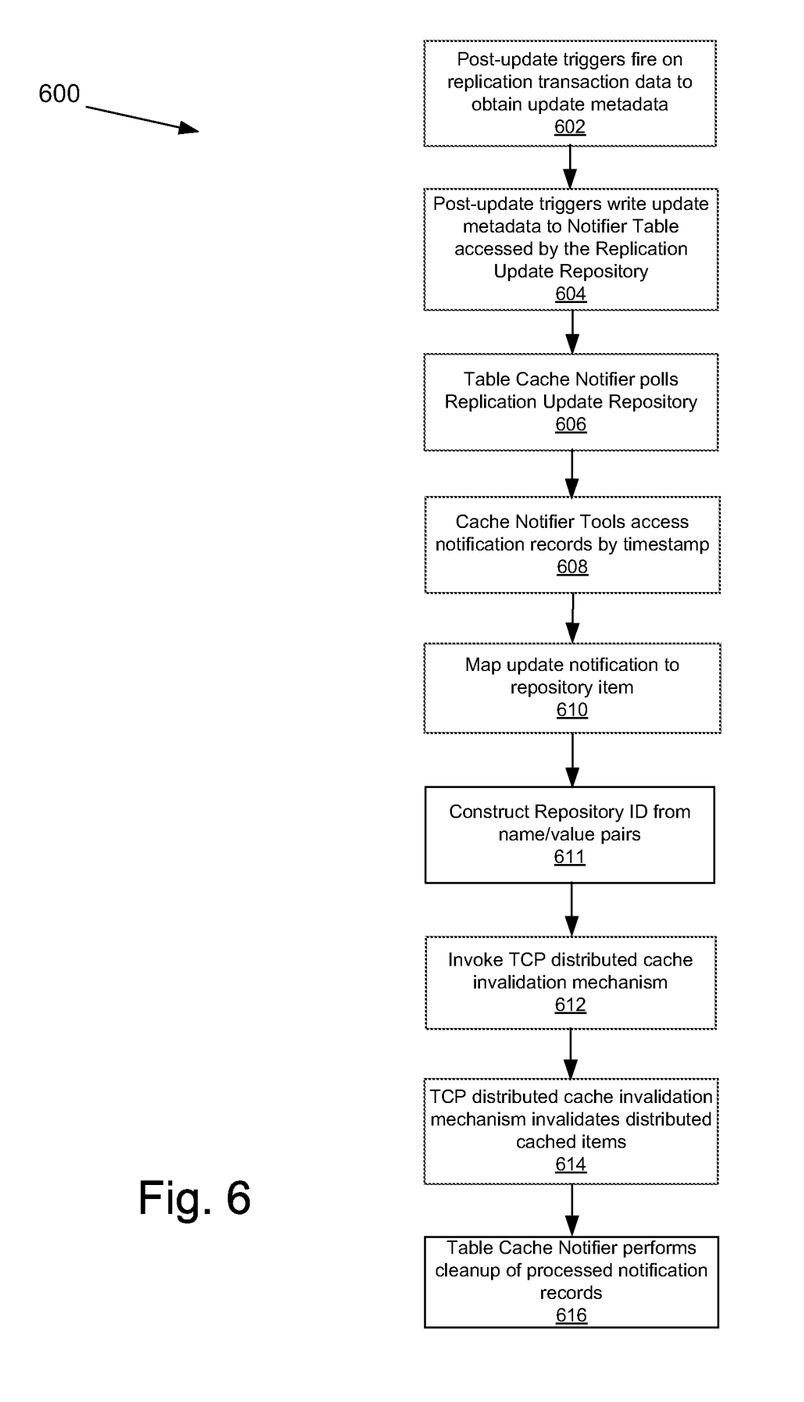
FIG. 6 is a flow chart illustrating the operation of an example embodiment of a brokered cache invalidation system.

Referring now to FIG. 6, in process step 602 the post-update row-level triggers are fired on the replication transaction data to obtain replication metadata including high-precision time stamps of when updates are committed to the local database, the name of the database table being updated, and a list of key-value pairs. In process step 604, the post-update row-level triggers write the replication metadata to the notifier table represented in the Replication Update Repository.

In process step 606 the Table Cache Notifier polls the update metadata stored in the Notifier Table using the representation in the Replication Update Repository by querying at scheduled intervals to process batches of replication update notification metadata. The length of the scheduled interval is selected based on a tradeoff between the performance impact of frequent polling activity and the risk impact of keeping stale data in the cache. For more frequent polling with a smaller batch size the schedules interval can be decreased until the service is effectively running continuously, and for less frequent polling with a larger batch size the scheduled interval can be increased so that the service runs more intermittently. The current timestamp provided by the database server is selected as a demarcation point for the current batch of notifications, and also recorded for future cleanup purposes.

In process step 608, the Cache Notifier Tools access the Notifier Table update metadata records represented in the Replication Update Repository by comparing the database timestamp to the value of the timestamp stored in each of the notification metadata records. A maximum age attribute value may be set so that the Cache Notifier Tools will not consider as valid any notification records that have a timestamp indicating that the age of the record exceeds the maximum age attribute value.

In process step 610, the Cache Notifier Tools reads the table name stored in the Notification Table metadata update record from the Replication Update Repository and provides it to the Repository Table Mapper. The Repository Table Mapper uses the value to match the table name to key in the map data structure, which produces one or more Repository Table Monitor Entry objects, each of which contains a repository item descriptor in distributed cache mode.

In process step 611, the Cache Notifier Tools constructs the unique ID of the repository item that is to be invalidated based on the list of name/value pairs provided by the Notifier Table and represented in the Replication Update Repository. For each name/value pair in the list, the GSA repository item descriptor model is queried for the data type of the column corresponding to the name attribute, and a value is set with the correct representation of the value attribute. At the end of this process the Cache Notifier Tools combines the correctly represented values to provide the ID of the repository item that is to be invalidated.

In process step 612, the Cache Notifier Tools invoke the standard TCP distributed cache invalidation system and provide the identity of the cached repository item that is to be invalidated. In an example embodiment, the TCP distributed cache invalidation system invalidates cached items based on the repository item descriptor previously provided by the Repository Table Mapper using the ID previously derived by the Cache Notifier Tools from the primary keys stored in the Notifier Table update metadata and represented in the replication update repository. The GSA event server generates a cache invalidation event for the cached repository item that is to be invalidated and provides the routing information to the same item descriptors at other application servers.

In process step 614, the standard TCP distributed cache invalidation system invalidates all cached copies of the cached repository item that is to be invalidated at Data Center B.

In process step 616, the Table Cache Notifier performs cleanup of the metadata update records in the Notifier Table at Data Center B for update metadata records older than the database timestamp previously recorded so they will not be processed again.

Figure 7:
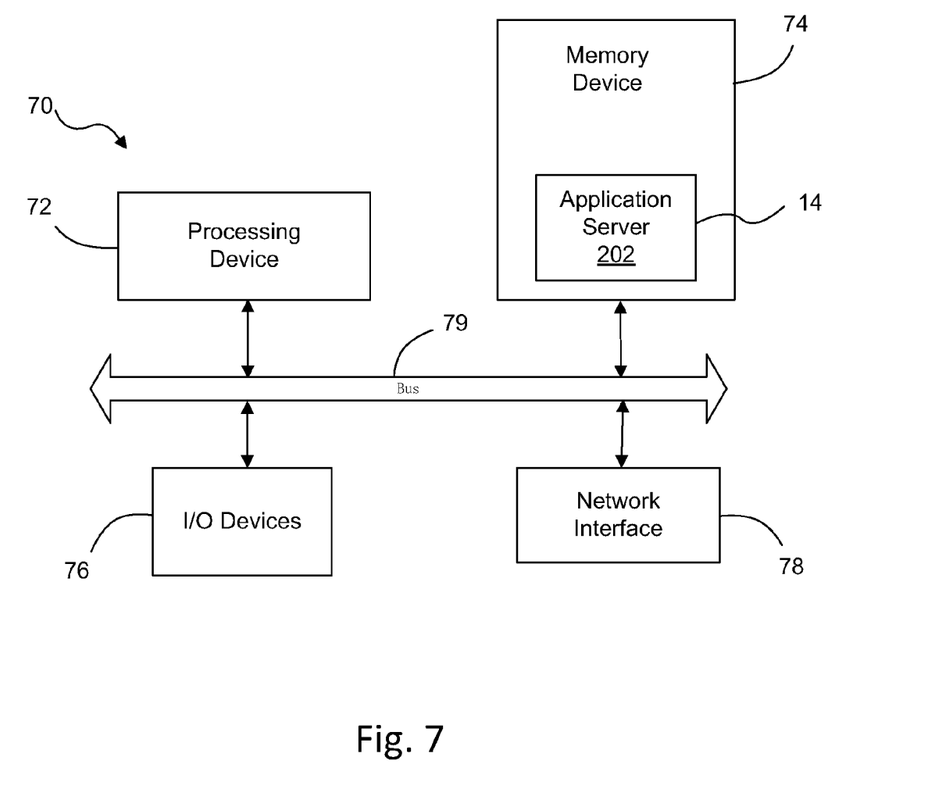
FIG. 7 is a block diagram of an example server computer.

FIG. 7 is a block diagram of an embodiment of a computer system 70 that can be used to run application servers. In this embodiment, computer system 70 includes a processing device 72, a memory device 74, input/output (I/O) devices 76, and a network interface 78, each interconnected via a bus 79. Processing device 72 may be a general-purpose or specific-purpose processor or microcontroller. Computer system 70 can be configured from multiple devices in multiple locations.

In this embodiment, memory device 74 is configured to store data and program code including application server(s) 202. Memory device 74 may include one or more internally fixed storage units, removable storage units, and/or remotely accessible storage units. The storage units can be configured to store information, data, instructions, and/or software code. The storage units may include any combination of volatile memory and/or non-volatile memory such a DRAM, disc drives, flash memory, SRAM, etc.

Memory device 74 can also store program code that enables processing device 72 to execute procedures for enabling one or more users to interact with application servers. Various logical instructions or commands may be included in the program code for reviewing and manipulating the web components. The embodiments of web components described in the present disclosure can be implemented in hardware, software, firmware, or a combination thereof. When implemented in software or firmware, application server 14 can be stored in memory device 74 and executed by processing device 72. When implemented in hardware, the web components and other systems can be implemented in processing device 72 using discrete logic circuitry, an application specific integrated circuit (ASIC), a programmable gate array (PGA), a field programmable gate array (FPGA), other suitable logic circuit, or any combination thereof.

Application servers and/or other related circuitry and systems, which can be stored partially or fully in memory device 74, and any other software, programs, or computer code including executable logical instructions as described herein, can be embodied in non-transitory computer-readable media for execution by any suitable processing device, such as processing device 72. The computer-readable media as described herein can include one or more suitable physical media components that can store the software, programs, or computer code for a measurable length of time. I/O devices 76 may include input mechanisms such as keyboards, keypads, cursor control devices, or other data entry devices for entering information in memory device 74. I/O devices 76 may also include output devices, such as computer monitors, audio output devices, printers, or other peripheral devices for communicating information to a user.

Although the description has been described with respect to particular embodiments thereof, these particular embodiments are merely illustrative, and not restrictive. For example, although example embodiments have been described utilizing the GoldenGate data integration software the example embodiments described above can be modified to operate with other data integration software in view of the teachings provided herein.

Any suitable programming language can be used to implement the routines of particular embodiments, including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software, firmware or hardware or a combination of all three. The control logic, when executed by one or more processors, may be operable to perform that which is described in particular embodiments.

Particular embodiments may be implemented by using a programmed general purpose digital computer, application specific integrated circuits, programmable logic devices, field programmable gate arrays, and/or optical, chemical, biological, quantum or nanoengineered systems, components and mechanisms. In general, the functions of particular embodiments can be achieved by any means as is known in the art. Distributed and/or networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an" and "the" include plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by a computer system including one or more processors at a first data center, for invalidating items using a distributed cache invalidation system at the first data center, where application servers located at two or more data centers are served application data from databases stored at the two or more data centers and where a database replication program is utilized to assure that databases at different data centers store a same copy of the application data and where database table rows are represented by repository items having properties corresponding to database columns and with repository items including an item descriptor that maps the repository item to a database table and configuration settings which describe rules for reading, writing, storing and deleting the item descriptor, the method comprising:

writing to a notifier table, by the computer system, metadata obtained from a replication message stream transmitted by the database replication program on a wide area network (WAN) connecting the first data center and second data center, with the replication message stream indicating updates made to the tables of the database at the second data center that are to be replicated as updates to corresponding ones of the tables of the database at the first data center, where the second data center is remote from the first data center and where the first and second data centers include application servers having a cache memory local to each application server and with the cache memories at each of the first and second data centers holding a portion of the database and participating in the distributed cache invalidation system;

representing, by the computer system, items in the notifier table as notification items in a replication update repository, with each notification item holding metadata including a name of an updated first table of the database at the first data center and a name/value pair;

creating, by the computer system, a mapping data structure mapping having a key being a table name for each table in the database and with each key having values being only repository items having configuration settings indicating participation in the distributed cache invalidation system;

identifying, by the computer system and using the mapping structure and based on the table name read from a first accessed notification item in the replication update repository, one or more identified repository items that participate in the distributed cache invalidation system;

constructing, by the computer system, a unique identification (ID) value for an identified repository item representing an updated row of the table updated at the second data center using one or more name/value pairs stored in the first accessed notification item; and invoking, by the computer system, a Transport Control Protocol (TCP) distributed cache invalidation system implemented only at the first data center to invalidate the repository item identified by the unique ID value.

2. The method of claim 1 where the creating a mapping data structure table name further comprises:

inspecting the item descriptor of a plurality of the repository items that use the distributed cache invalidation system to identify a group of one or more items in the plurality that reference a first table having a first table name; and associating the item descriptors of the one or more items to the first table name.

3. The method of claim 1 where the TCP distributed cache invalidation system implemented only at the first data center includes:

a mesh connecting event servers of all server applications using the TCP distributed cache invalidation system.

4. The method of claim 1 with the notification item further comprising:

a timestamp indicating when a replicated change was committed; and further comprising;

periodically polling, using the one or more processors, the metadata to access the notification items having the timestamp indicating that the age of the notification item is less than a maximum value.

5. The method of claim 4 with the periodically polling further comprising:

adjusting a duration of a scheduled polling period.

6. The method of claim 1 with the creating a mapping data structure further comprising:

storing references to the item descriptor in the plurality of repository items that use distributed cache invalidation system.

7. The method of claim 1 with the invoking further comprising:

providing primary keys stored in the notification item to a cache invalidation system subscriber table.

8. An apparatus configured to invalidate items using a distributed cache invalidation system at a first data center, where application servers located at two or more data centers are served application data from databases stored at the two or more data centers and where a database replication program is utilized to assure that databases at different data centers store a same copy of the application data and where database table rows are represented by repository items having properties corresponding to database columns and with repository items including an item descriptor that maps the repository item to a database table and configuration settings which describe rules for reading, writing, storing and deleting the item descriptor, the apparatus comprising:

one or more digital processors coupled to a non-transitory processor-readable storage device, with the one or more digital processors configured to execute one or more instructions included in the non-transitory processor-readable storage device to perform the following acts:

writing to a notifier table metadata obtained from a replication message stream transmitted by the database replication program on a wide area network (WAN) connecting the first data center and second data center, with the replication message stream indicating updates made to tables of the database at the second data center that are to be replicated as updates to corresponding tables of the database at the first data center, where the second data center is remote from the first data center and where the first and second data centers include application servers having a cache memory local to each application server and with the cache memories at each of the first and second data centers holding a portion of the database and participating in the distributed cache invalidation system;

representing items in the notifier table as notification items in a replication update repository, with each notification item holding metadata including a name of an updated first table of the database at the first data center and a name/value pair;

creating a mapping data structure mapping having a key being a table name for each table in the database and with each key having values being only repository items having configuration settings indicating participation in the distributed cache invalidation system;

identifying, using the mapping structure and based on the table name read from a first accessed notification item in the replication update repository, one or more identified repository items that participate in the distributed cache invalidation system;

constructing a unique identification (ID) value for an identified repository item representing an updated row of the table updated at the second data center using one or more name/value pairs stored in the first accessed notification item; and invoking a Transport Control Protocol (TCP) distributed cache invalidation system implemented only at the first data center to invalidate the repository item identified by the unique ID value.

9. The apparatus of claim 8 with the TCP distributed cache invalidation system further comprising:

a mesh connecting event servers of all server applications using the distributed cache invalidation system.

10. The apparatus of claim 8 with the one or more digital processors further configured to perform the act of:
  inspecting the item descriptor of a plurality of the repository items that use the distributed cache invalidation system to identify a group of one or more items in the plurality that reference a first table having a first table name; and
  associating the item descriptors of the one or more items to the first table name.

11. The apparatus of claim 8 where the notification item includes a timestamp indicating when a replicated change was committed and with the one or more digital processors further configured to perform the act of:
  periodically polling, using the one or more processors, the metadata to access the notification items having the timestamp indicating that the age of the notification item is less than a maximum value.

12. The apparatus of claim 11 with the one or more digital processors further configured to perform the act of:
  adjusting a duration of a scheduled polling period.

13. The apparatus of claim 8 with the one or more digital processors further configured to perform the act of:
  storing references to the item descriptor in the plurality of repository items that use distributed cache invalidation system.

14. The apparatus of claim 8 with the one or more digital processors further configured to perform the act of:
  providing primary keys stored in the notification item to a cache invalidation system subscriber table.

15. A non-transitory computer-readable storage medium comprising encoded program code for execution by one or more computer processors on a computer to invalidate items using a distributed cache invalidation system at a first data center, where application servers located at two or more data centers are served application data from databases stored at the two or more data centers and where a database replication program is utilized to assure that databases at different data centers store a same copy of the application data and where database table rows are represented by repository items having properties corresponding to database columns and with repository items including an item descriptor that maps the repository item to a database table and configuration settings which describe rules for reading, writing, storing and deleting the item descriptor, the program code when executed is executable to perform the acts of:
  writing to a notifier table metadata obtained from a replication message stream transmitted by the database replication program on a wide area network (WAN) connecting the first data center and second data center, with the replication message stream indicating updates made to tables of the database at the second data center that are to be replicated as updates to corresponding tables of the database at the first data center, where the second data center is remote from the first data center and where the first and second data centers include application servers having a cache memory local to each application server and with the cache memories at each of the first and second data centers holding a portion of the database and participating in the distributed cache invalidation system;
  representing items in the notifier table as notification items in a replication update repository, with each notification item holding metadata including a name of an updated first table of the database at the first data center and a name/value pair;
  creating a mapping data structure mapping having a key being a table name for each table in the database and with each key having values being only repository items having configuration settings indicating participation in the distributed cache invalidation system;
  identifying, using the mapping structure and based on the table name read from a first accessed notification item in the replication update repository, one or more identified repository items that participate in the distributed cache invalidation system;
  constructing a unique identification (ID) value for an identified repository item representing an updated row of the table updated at the second data center using one or more name/value pairs stored in the first accessed notification item; and
  invoking a Transport Control Protocol (TCP) distributed cache invalidation system implemented only at the first data center to invalidate the repository item identified by the unique ID value.

16. The non-transitory computer-readable storage medium of claim 15 further comprising program code that when executed is executable to perform the acts of:
  inspecting the item descriptor of a plurality of the repository items that use the distributed cache invalidation system to identify a group of one or more items in the plurality that reference the first table; and
  associating the item descriptors of the one or more items to the first table.

17. The non-transitory computer-readable storage medium of claim 15 where the notification item includes a timestamp indicating when a replicated change was committed and further comprising program code that when executed is executable to perform the act of:
  periodically polling, using the one or more processors, the metadata to access the notification items having the timestamp indicating that the age of the notification item is less than a maximum value.

18. The non-transitory computer-readable storage medium of claim 17 further comprising program code that when executed is executable to perform the act of:
  adjusting a duration of a scheduled polling period.

19. The non-transitory computer-readable storage medium of claim 15 further comprising program code that when executed is executable to perform the act of:
  storing references to the item descriptor in the plurality of repository items that use distributed cache invalidation system.

20. The non-transitory computer-readable storage medium of claim 15 further comprising program code that when executed is executable to perform the act of:
  providing primary keys stored in the notification item to a cache invalidation system subscriber table.

* * * * *